(12) United States Patent
Riedel et al.

(10) Patent No.: US 7,003,116 B2
(45) Date of Patent: Feb. 21, 2006

(54) SYSTEM FOR ENCRYPTED FILE STORAGE OPTIMIZATION VIA DIFFERENTIATED KEY LENGTHS

(75) Inventors: Erik Riedel, San Francisco, CA (US); Mahesh Kallahalla, Palo Alto, CA (US); Ram Swaminathan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 901 days.

(21) Appl. No.: 09/984,936

(22) Filed: Oct. 31, 2001

(65) Prior Publication Data
US 2003/0086570 A1 May 8, 2003

(51) Int. Cl.
*H04L 9/00* (2006.01)

(52) U.S. Cl. ...................................... 380/277; 713/165

(58) Field of Classification Search ............... 713/201, 713/165; 380/277

See application file for complete search history.

(56) References Cited
U.S. PATENT DOCUMENTS 5,563,946 A * 10/1996 Cooper et al. ................ 705/56
5,950,198 A * 9/1999 Falls et al. ..................... 707/8

* cited by examiner

Primary Examiner—Justin T. Darrow
Assistant Examiner—Venkat Perungavoor
(74) Attorney, Agent, or Firm—Richard P. Lange (57) ABSTRACT

A key management module is utilized to improve efficiency in cryptographic systems. The key management module may monitor file usage and recommend (and/or implement) key pair changes. In particular, the key management module may be configured to periodically examine (or analyze) performance parameters (e.g., number of times written, number of times read, etc.) associated with a user's files. A network monitor module may be configured to gather and maintain records of the associated performance parameters. The key management module may be further configured to compare the performance parameters of a given file with a table of key level ranges. The table of key lengths may be configured to provide a listing of multiple key lengths, each key length corresponding to an activity level of a performance parameter, e.g., relative read/write access frequency. The key management module may recommend changing the relative length of the read and write keys based on the comparison of the performance parameters with the table of key level ranges.

29 Claims, 6 Drawing Sheets

SYSTEM FOR ENCRYPTED FILE STORAGE OPTIMIZATION VIA DIFFERENTIATED KEY LENGTHS

RELATED APPLICATIONS

The following commonly assigned applications, filed concurrently, may contain some common disclosure and may relate to the present invention. Thus, the following applications are hereby incorporated by reference:

U.S. patent application Ser. No. 09/984,927 entitled "SYSTEM FOR ENABLING LAZY-REVOCATION THROUGH RECURSIVE KEY GENERATION"

U.S. patent application Ser. No. 09/984,928 entitled "SYSTEM FOR OPTIMIZED KEY MANAGEMENT WITH FILE GROUPS"

U.S. patent application Ser. No. 09/984,926 entitled "SYSTEM FOR ENSURING DATA PRIVACY AND USER DIFFERENTIATION IN A DISTRIBUTED FILE SYSTEM"

FIELD OF THE INVENTION

This invention relates generally to cryptographic file storage systems. In particular, the invention relates to optimizing efficiency in a cryptographic file storage system based on differentiated key lengths.

DESCRIPTION OF THE RELATED ART

Advances in computer and network technology have made computer networks an affordable option for businesses, academia, governments, etc. As computer networks proliferate, users find they may easily share and/or exchange information (data, files, messages, etc.) among themselves. Although users would prefer to have an open and free environment, there are malicious users (e.g., hackers) that may use the information contained in the computer networks for mischief or worse.

In order to deter malicious users, some conventional file systems have utilized cryptographic systems to provide a measure of protection. For instance, one conventional file system utilizes a symmetric encryption algorithm to encode the files stored on the file system. The symmetric encryption algorithm generates a key used to encode the files to be stored, and the same key is used to decode the encrypted files.

Although cryptographic systems are effective in providing security, the computational load of encrypting and/or decrypting information on a system may be heavy. As a result, users who require repeated access to a file may be forced to wait a lengthy period of time before the users can access the file. This may lead to frustration and a lack of efficiency for a user. Moreover, devoting system resources to implement the cryptographic systems may lead to slower response times for non-cryptographic users of the system resources.

SUMMARY OF THE INVENTION

In accordance with the principles of the present invention, one aspect of the invention pertains to a method of improving storage system efficiency. The method includes comparing a plurality of performance parameters of a file with a respective plurality of predetermined values. The method also includes modifying a first key of the file in response to a performance parameter of the plurality of performance parameters not matching a respective predetermined value, whereby the first key is utilized in a security procedure for the file.

Another aspect of the present invention relates to a method of improving efficiency in a cryptographic system. The method includes comparing a plurality of performance parameters of a file with a respective plurality of predetermined values and altering a length of a first key in response to one performance factor of the plurality of performance parameters of the file not matching a respective one of predetermined value. The method also includes altering a length of a second key in response to the alteration of the first key, where the first key and the second key are utilized in a security procedure for the file.

Yet another aspect of the present invention pertains to a method of improving efficiency in a cryptographic system. The method includes comparing a plurality of performance parameters of a file with a respective range of plurality of predetermined values and altering a length of a first key in response to one performance factor of the plurality of performance parameters of the file falling outside a respective range of one predetermined value. The method also includes altering a length of a second key in response to the alteration of the first key, where the first key and the second key are utilized in a security procedure for the file.

Yet another aspect of the present invention relates to a system for improving storage system efficiency. The system includes a file system, a network monitor module, and a key management module. The file system is configured to provide access to a plurality of files. The network monitoring module is configured to monitor a plurality of performance factors on the file system. The key management module is configured to compare the plurality of performance factors with a respective plurality of predetermined values and is also configured to modify a first key of a file stored on the file system in response to one performance factor of the plurality of performance factors not equaling a respective one predetermined value, whereby the first key is utilized in a security procedure for the file on the file system.

Yet another aspect of the present invention relates to a system for improving storage system efficiency. The system includes a file system, a network monitor module, and a key management module. The file system is configured to provide access to a plurality of files. The network monitoring module is configured to monitor a plurality of performance factors of the plurality of files. The key management module is configured to compare the plurality of performance factors with a respective plurality of predetermined values and is also configured to alter a length of a first key in response to the one performance factor of said plurality of performance factors not matching a respective one predetermined value. The key management module is further configured to alter a length of a second key in response to the alteration of the first key, where the first key and the second key are utilized in a security procedure for the file stored on the file system.

Yet another aspect of the present invention relates to a system for improving storage system efficiency. The system includes a file system, a network monitor module, and a key management module. The file system is configured to provide access to a plurality of files. The network monitoring module is configured to monitor a plurality of performance factors of the plurality of files. The key management module is configured to compare said plurality of performance factors with a respective range of plurality of predetermined values and is also configured to alter a length of a first key in response to the one performance factor of the plurality of performance factors falling outside a respective range of one predetermined value. The key management module is further configured to alter a length of a second key in response to the alteration of the first key, where the first key and the second key are utilized in a security procedure for the file stored on the file system.

Additional aspects and novel features of the invention will be set forth in part in the description which follows and in part will become apparent to those skilled in the art upon examination of the following or may be learned by the practice of the invention. The aspects of the present invention may be realized and attained by means of instrumentalities and combinations particularly pointed in the appended claims.

BRIEF DESCRIPTION OF THE DRAWINGS

Various features and aspects of the present invention can be more fully appreciated as the same become better understood with reference to the following detailed description of the present invention when considered in connection with the accompanying drawings, in which.

DETAILED DESCRIPTION OF A PREFERRED EMBODIMENT

For simplicity and illustrative purposes, the principles of the present invention are described by referring mainly to an exemplary embodiment of a key management module in a cryptographic file storage system. However, one of ordinary skill in the art would readily recognize that the same principles are equally applicable to, and can be implemented in, many types of cryptographic system, and that any such variation does not depart from the true spirit and scope of the present invention. Moreover, in the following detailed description, references are made to the accompanying drawings, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with the principles of the present invention, a key management module is utilized to improve the efficiency of a storage system. In one aspect, the key management module may be configured to assign an asymmetric key pair, a read key and a write key, to a file based on anticipated usage of the file. The write key may be configured to encrypt the file and the read key may be configured to decrypt the file. In particular, the key management module may determine from a user the time-criticality of a file in response to the creation of the file. If the key management module determines that the file is time critical, the key management may be configured to assign a shorter length write key as compared to the read key. Otherwise, the key management module may be configured to estimate (or predict) an access pattern for the created file based on the file type (e.g., word processing, log, etc.). Thus, if the created file is anticipated to be read-mostly, the key management module may be configured to assign a relatively shorter length read key (or longer length write key). If the created file is estimated to be write-often, the key management module may be configured to assign a relative shorter length write key (or longer length read key).

In another aspect, the key management module may monitor file usage and recommend (and/or implement) key pair changes. In particular, the key management module may be configured to periodically examine (or analyze) performance parameters (e.g., number of times written, number of times read, etc.) associated with a user's files. A network monitor module may be configured to gather and maintain records of the associated performance parameters. The key management module may be further configured to compare the performance parameters of a given file with a table of key level ranges. The table of key lengths may be configured to provide a listing of multiple key lengths, each key length corresponding to an activity level of a performance parameter, e.g., relative read/write access frequency. The key management module may recommend changing the size of a read or write key based on the comparison of the performance parameters with the table of key level ranges. Alternatively, the key management module may implement changing the size of a read key and the complementary write key based on the comparison of the performance parameters with the table of key level ranges. Accordingly, the key management module may improve the efficiency of a computer system by reducing the computational load associated with encrypting and/or decrypting a file based on the usage of the file.

Figure 1:
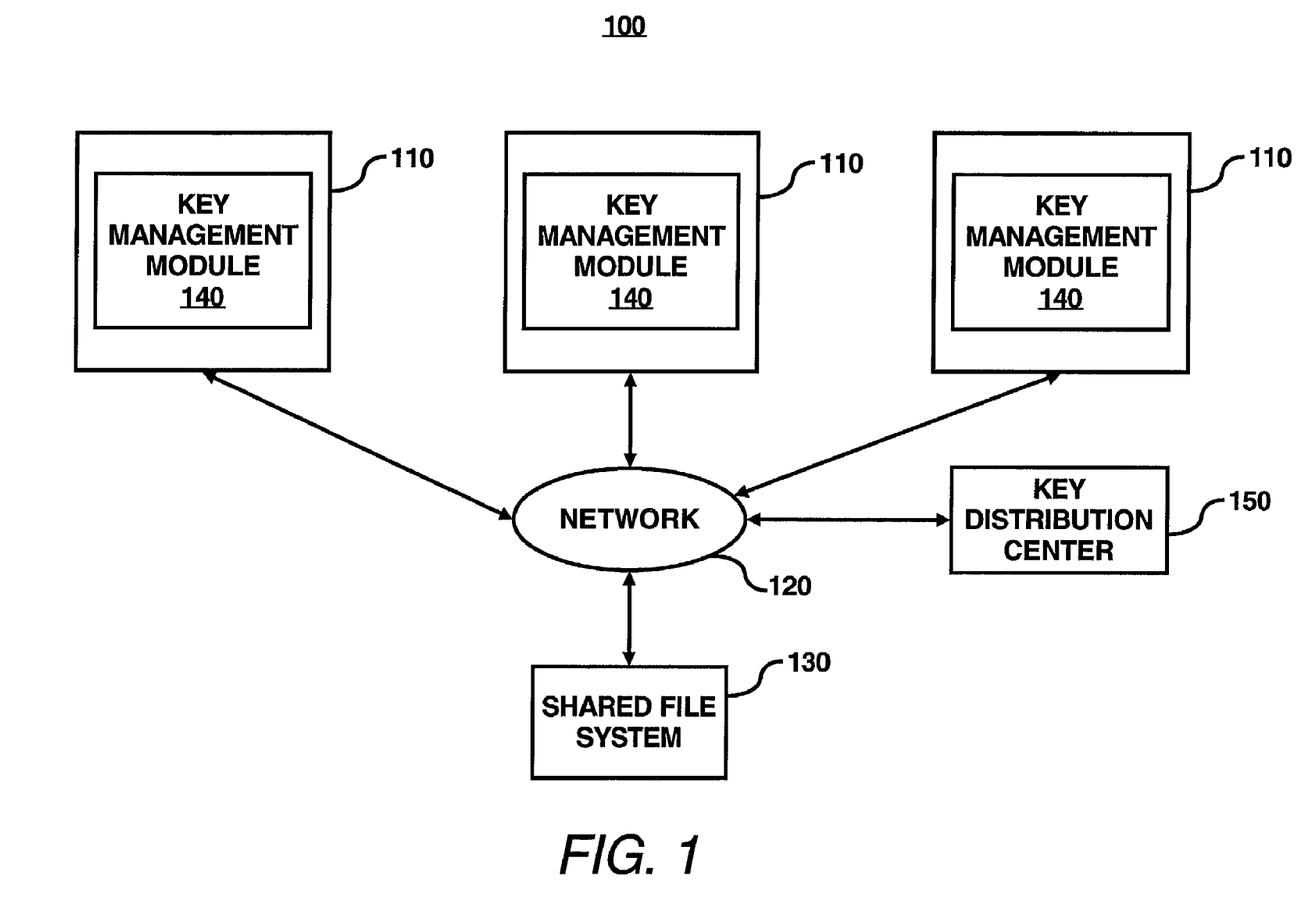
FIG. 1 illustrates a block diagram of a computer system utilizing a key management module in accordance with an exemplary embodiment of the present invention.

FIG. 1 illustrates a block diagram of a computer system 100 utilizing an exemplary key management module 140 in accordance with an embodiment of the present invention. As shown in FIG. 1, the computer system 100 includes user stations 110, a network 120, and a shared file system 130.

The user stations 110 may be configured to provide access to computer software applications and/or data. The computer software applications and/or data may be located in a central location (e.g., a server) or located within the user stations 110. The user stations 110 may be implemented with a laptop, a personal computer, a workstation, a portable wireless device, and other similar electronic devices.

The user stations 110 may be further configured to interface with the network 120 through respective network interfaces of the user stations 110. The network 120 may be configured to provide a communication channel between the user stations 110 as well as to the shared file system 130. The network 120 may be implemented as a local area network, a wide area network or other similar network architecture. Further, the network 120 may be configured to provide communication services utilizing network protocols such as Ethernet, TCP/IP, token ring, X. 25, etc.

The shared file system 130 may also be configured to interface to the network 120 through a network interface (not shown). The shared file system 130 may provide storage and access to files created by users of the computer system 100. The shared file system 130 may be implemented as a single disk, a JBOD system, a RAID system or other similar disk storage architecture.

The key management module 140 of the user stations 110 may be configured to provide security services to the user station. In particular, the key management module 140 may provide a security procedure for an asymmetric key pair, a read key and a write key, for each file created by the user, which is disclosed in the co-pending application entitled "SYSTEM FOR ENCRYPTED FILE STORAGE USING ASYMMETRIC KEYS TO DIFFERENTIATE READERS AND WRITERS" Ser. No. 09/984,926 and is hereby incorporated by reference.

An asymmetric key pair has a complementary property that the read key may only be used to decrypt a file that has been encrypted with the write key. Moreover, each key of the asymmetric key pair may have a minimum length to ensure a minimum level of security for the file. In a likewise fashion, each key may have a maximum length to ensure a maximum level of security as defined by the user. As a result of the complementary property, varying the size of one key affects the size of the other key in a complementary fashion, i.e., reduction in the size of the first key, increases the size of the second key of the asymmetric key pair and vice versa.

Returning to FIG. 1, the key management module 140 may be also configured to increase the efficiency of the shared file system 130 by analyzing the performance parameters (e.g., read/write frequency) associated with the files of a user. In particular, the key management module 140 may compare the performance parameters with a table of key level range. The key level range table provides a listing of sizes of asymmetric key pairs, each listing corresponding to a performance level of a performance parameter (e.g., read frequency). The key management module 140 may also be configured to recommend (or implement) changes to the relative sizes of the asymmetric key pair associated with each file based on the comparison of the performance parameters and the key level range table.

The key management module 140 may be further configured to assign a length to each of the keys in the asymmetric key pair based on anticipated usage and/or file type of a created file. In particular, the key management module 140 may determine from a user whether the created file is time critical. If the created file is time critical, the key management module may assign a relative shorter length write key and a relatively longer length read key for the asymmetric key pair assigned to the created file. Thus, the computational load of implementing future changes to the file is reduced, thereby increasing efficiency of the storage system.

Otherwise, if the created file is not time critical, the key management module may estimate an access pattern based on the file type of the created file. In particular, if the file type is a file that is accessed as a read-often file, a relatively longer length write key with a relatively shorter length read key is assigned as the asymmetric key pair for the created file. Otherwise, if the file type is a file that is accessed as a write-often file, a relatively shorter length write key with a relatively longer read key is assigned as the asymmetric key pair for the created file. Thus, by assigning relative key lengths based on the access pattern of a file, the computation load of future access may be reduced in the encrypting/decrypting of the file, thereby increasing efficiency of the shared file system and reducing wait times for the user.

The computer system 100 also includes an optional key distribution center 150. The key distribution center 150 may be configured to provide secure storage of the keys used in the computer system 100. The key distribution center 150 may also provide authentication services for the cryptographic users of the computers system 100 in order to transfer keys among the cryptographic users.

Figure 2:
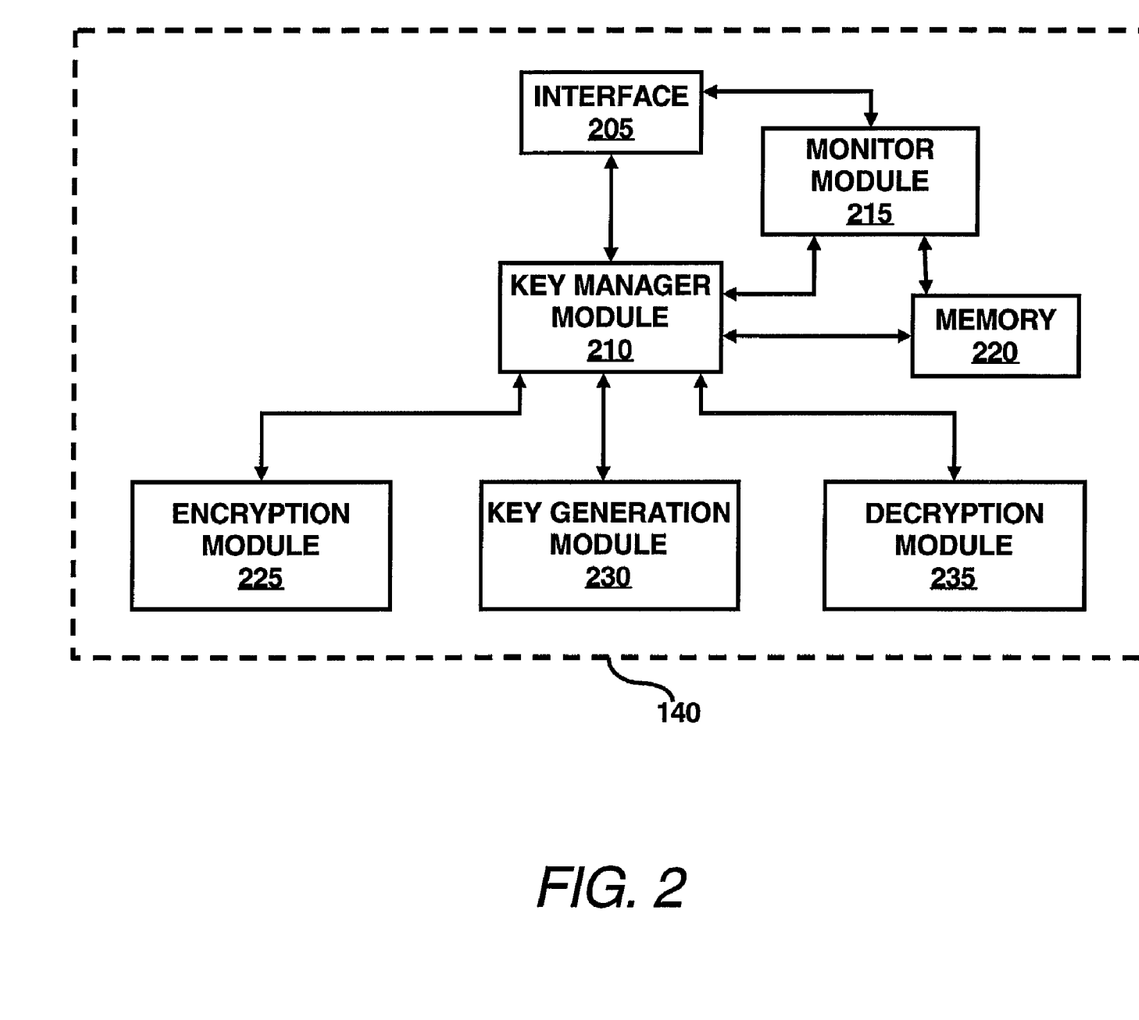
FIG. 2 illustrates a block diagram of a key management module shown in FIG. 1 in accordance with an exemplary embodiment of the present invention.

FIG. 2 illustrates an exemplary block diagram of a key management module 140 shown in FIG. 1 in accordance with an embodiment of the present invention. As shown in FIG. 2, the key management module 140 includes an interface 205, a key manager module 210, a monitor module 215, a memory module 220, an encryption module 225, a key generation module 230 and a decryption module 235. Although, for illustrative purposes only, FIG. 2 illustrates the architecture of the key management module 140 with the above-mentioned components, it should be readily apparent to those of ordinary skill in the art that FIG. 2 represents a generalized schematic illustration of the key management module 140 and that other components may be added or existing components may be removed without departing from the spirit or scope of the present invention. Moreover, since FIG. 2 illustrates an embodiment of the architecture of the key management module 140, the architecture of the key management module 140 may be implemented as hardware, software, and/or embodiments and are well within the scope and spirit of the present invention.

The interface 205 of the key management module 140 may be configured to provide a communication conduit between the user station 110 and the key management module 140. The interface 205 may be implemented as a software interface through an application program interface (API) of an operating system of the user station 110, an interprocess programming communication (IPC), a function call or other similar communication conduit. The interface 205, in certain embodiments, may also be implemented as a hardware interface such as a RS-232, a universal serial bus port or other similar hardware interface.

The interface 205 may provide communication services to the key manager module 210. The key manager module 210 may be configured to provide optimization services of the key lengths for the key management module 140 as described above and further elaborated below.

The key manager module 210 may also be configured to interface with the monitor module 215. The monitor module 215 may be configured to monitor (or to access) performance parameters (or statistics, factors, etc.) associated with the files of a user stored on the shared file system 130. The performance parameters may be read frequency, write frequency, overall access rate, the granularity of access (request size), request locality, etc. The monitor module 215 may compile the performance parameters and store the compiled performance parameters in the memory module 220. In certain contemplated embodiments, the monitor module 215 may be configured to communicate with a central network monitoring module (e.g., a server, a file server, etc.) and retrieve the performance parameters in response to a request from the key manager module 210.

The memory module 220 may be configured to provide storage services for the key management module 140. The memory module 220 may store the compiled performance parameters from the monitor module 215 as well as storing a table of key level sizes for the key manager module 210. The memory module 220, in certain embodiments, may also provide storage of the asymmetric key pairs of a user.

The key manager module 210 may be configured to interface with the encryption module 225. The encryption module 225 may be configured to encrypt files with a write key of the asymmetric key pair generated by the key generation module 230. The key manager module 210 may provide a write key and a file (or a pointer to a file) and in return the encryption module 225 encrypts the file for storage on the shared file system 130 (shown in FIG. 1).

The key generation module 230 may be configured to generate an asymmetric key pair for a file in response to a seed value provided by a user of the user station 110. The asymmetric key pair may be generated using an asymmetric cryptographic algorithm such as the RSA algorithm, El-Gamal, or Cramer-Shoup. The key generation module 230 may be further configured to modify the length of each key in the asymmetric key pair. The asymmetric pair (d and e) is calculated from two large primes (p and q) via the modulus (N) as follows:

$$N=(p-1)(q-1)$$

$$ed=\Phi(N)$$

When changing the relative key lengths of e and d, the key generation module can re-calculate the modulus, and then choose a larger or smaller e as desired.

The decryption module 235 may be configured to decrypt a file with the respective read key of the assigned asymmetric key pair generated by the key generation module 230. The key manager module 210 may provide a read key and a pointer to a file and the decryption module 230 may provide a decrypted file in return for use on a respective user station 110.

Figure 3:
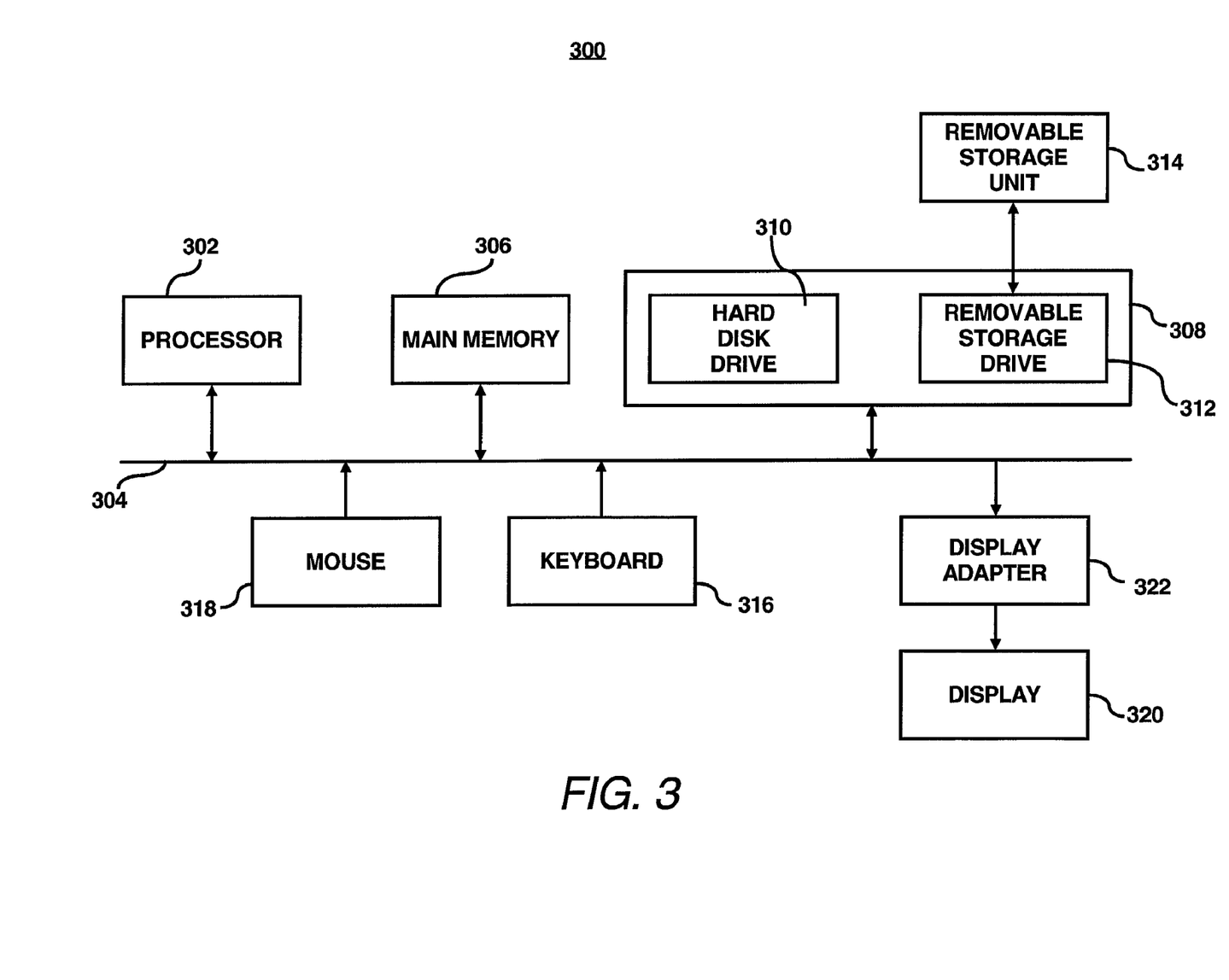
FIG. 3 illustrates a block diagram of a computing platform configured to executed a key management module in accordance with an exemplary embodiment of the present invention.

FIG. 3 illustrates an exemplary block diagram of a computing platform 300 configured to execute a key management module in accordance with an embodiment of the present invention. The functions of the key management module 140 may be implemented in program code and executed by the computer platform 300. The key management module 140 may be implemented in computer languages such as PASCAL, C, C++, JAVA, etc.

As shown in FIG. 3, the computer system 300 includes one or more processors, such as processor 302 that provides an execution platform for the user differentiation module 115. Commands and data from the processor 302 are communicated over a communication bus 304. The computer system 300 also includes a main memory 306, preferably Random Access Memory (RAM), where the software for the key management module 140 may be executed during runtime, and a secondary memory 308. The secondary memory 308 includes, for example, a hard disk drive 310 and/or a removable storage drive 312, representing a floppy diskette drive, a magnetic tape drive, a compact disk drive, etc., where a copy of software for the key management module 140 may be stored. The removable storage drive 312 reads from and/or writes to a removable storage unit 314 in a well-known manner. A user interfaces the user differentiation module 115 with a keyboard 316, a mouse 318, and a display 320. The display adaptor 322 interfaces with the communication bus 304 to receive display data from the processor 302 and converts the display data into display commands for the display 320.

Figure 4:
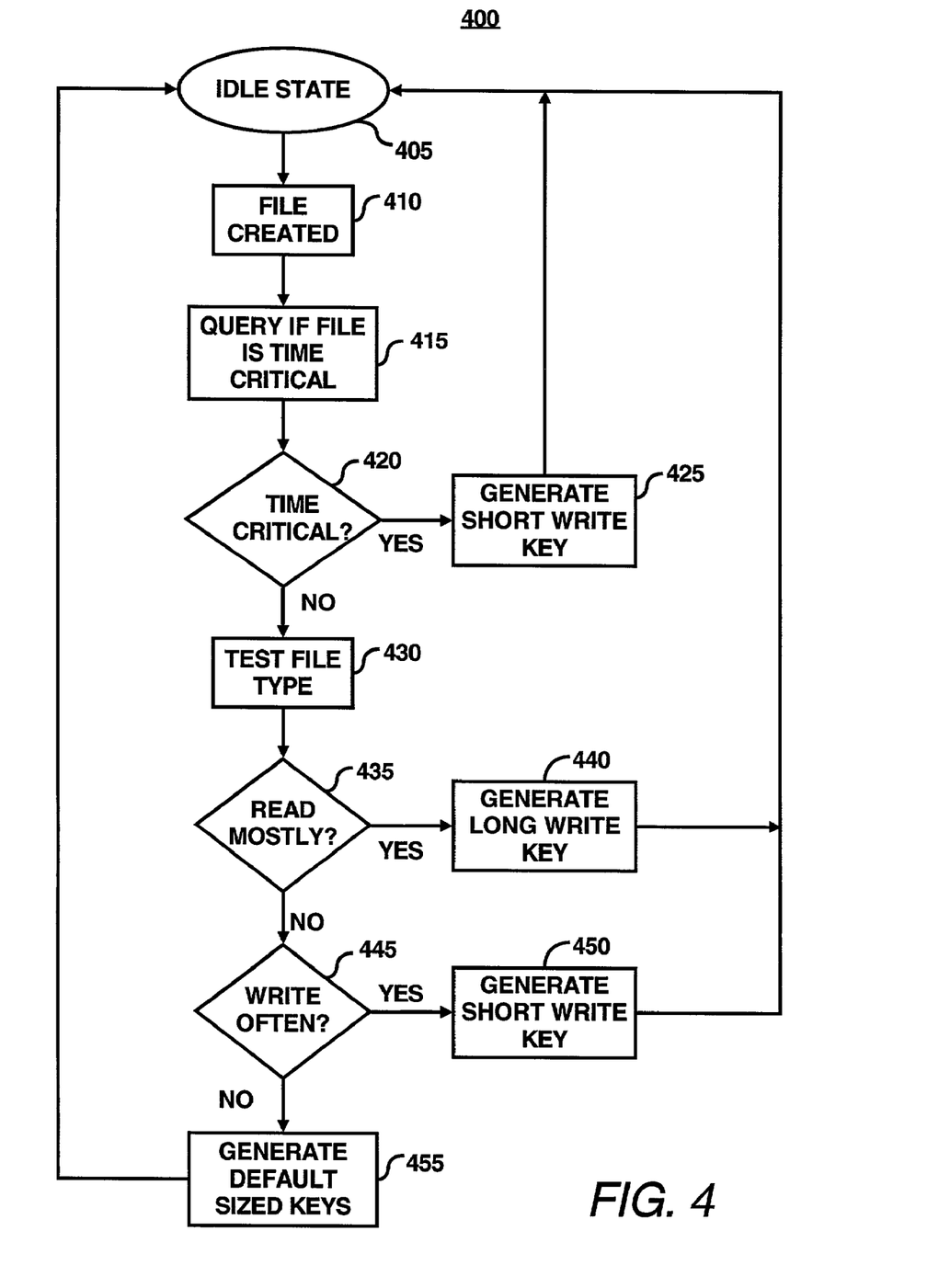
FIG. 4 illustrates a flow diagram for a first operational mode of the key management module shown in FIG. 1 in accordance with an exemplary embodiment of the present invention.

FIG. 4 illustrates an exemplary flow diagram for a first operational mode of the key management module 140 shown in FIGS. 1 and 2 in accordance with an embodiment of the present invention. Although, for illustrative purposes only, FIG. 4 illustrates a flow diagram for a first operational mode with the following steps, it should be readily apparent to those of ordinary skill in the art that FIG. 4 represents a generalized illustration of an embodiment of the key management module 140 and that other steps may be added or existing steps may be removed or modified without departing from the spirit or scope of the present invention.

As shown in FIG. 4, in step 405, the key manager module 210 may be configured to be in an idle state. The key manager module 210 may be configured to detect that a user created a file, e.g., utilizing the user station 110, in step 410. The key manager module 210 may also be configured to query the user whether the file is time-critical in step 415.

In step 420, the key manager module 210 receives a determination whether the file is time critical. If the file is time critical, the key manager module 210 may be configured to notify the key generation module 225 to generate a relatively shorter length write key with a complementary read key being of relatively longer length, in step 425. The key manager module 210 may be further configured to display the relatively short write key and the relatively longer read key as an asymmetric key pair for the created file. Subsequently, the key manager module 210 may return to an idle state of step 405.

Otherwise, in step 430, the key manager module 210 may be configured to determine the type of file that a user created in step 410. For example, the key manager module 210 may examine the file extension of the created file and determine the type of file by searching a listing configured to index a plurality of file extensions with respective file types. Once the file type has been determined, the key manager module 210 may access a database, table, listing or similar information stored in the memory module 220. The database may list the access frequency and what type of access for a given file type based on previous usage of the files stored on the shared file system 130. An example of such a table is given by Table I:

TABLE I

| File type | Write key length |
|---|---|
| log files | short |
| backup files | short |
| database files | medium |
| executables | long |
| configuration files | long |
| video file | long |

In step 435, the key manager module 210 may be configured to determine whether the file type is a read mostly type of file. If the file is a read mostly type, the key manager module 210 may be configured to notify the key generation module 225 to generate a relatively longer length write key with a complementary read key being of relatively shorter length, in step 440. The key manager module 210 may be further configured to display the relatively long write key and the relatively shorter read key as an asymmetric key pair for the created file and the key manager module 210 may return to the idle state of step 405.

Otherwise, in step 445, the key manager module 210 may be configured to determine whether the file type is a write-often. If the file is write-often, the key manager module 210 may be configured to notify the key generation module 225 to generate a relatively shorter length write key with a complementary read key being of relatively longer length, in step 450. The key manager module 210 may be further configured to display the relatively short write key and the relatively longer read key as an asymmetric key pair for the created file and the key manager module 210 may subsequently return to the idle state of step 405.

Otherwise, in step 455, the key manager module 210 may be configured to notify the key generation module 225 to generate a default sized read and write key for the created file, the default size may be user defined. The key manager module 210 may be further configured to display the default-sized keys as an asymmetric key pair for the created file and the key manager module 210 may return to the idle state of step 405.

Figure 5:
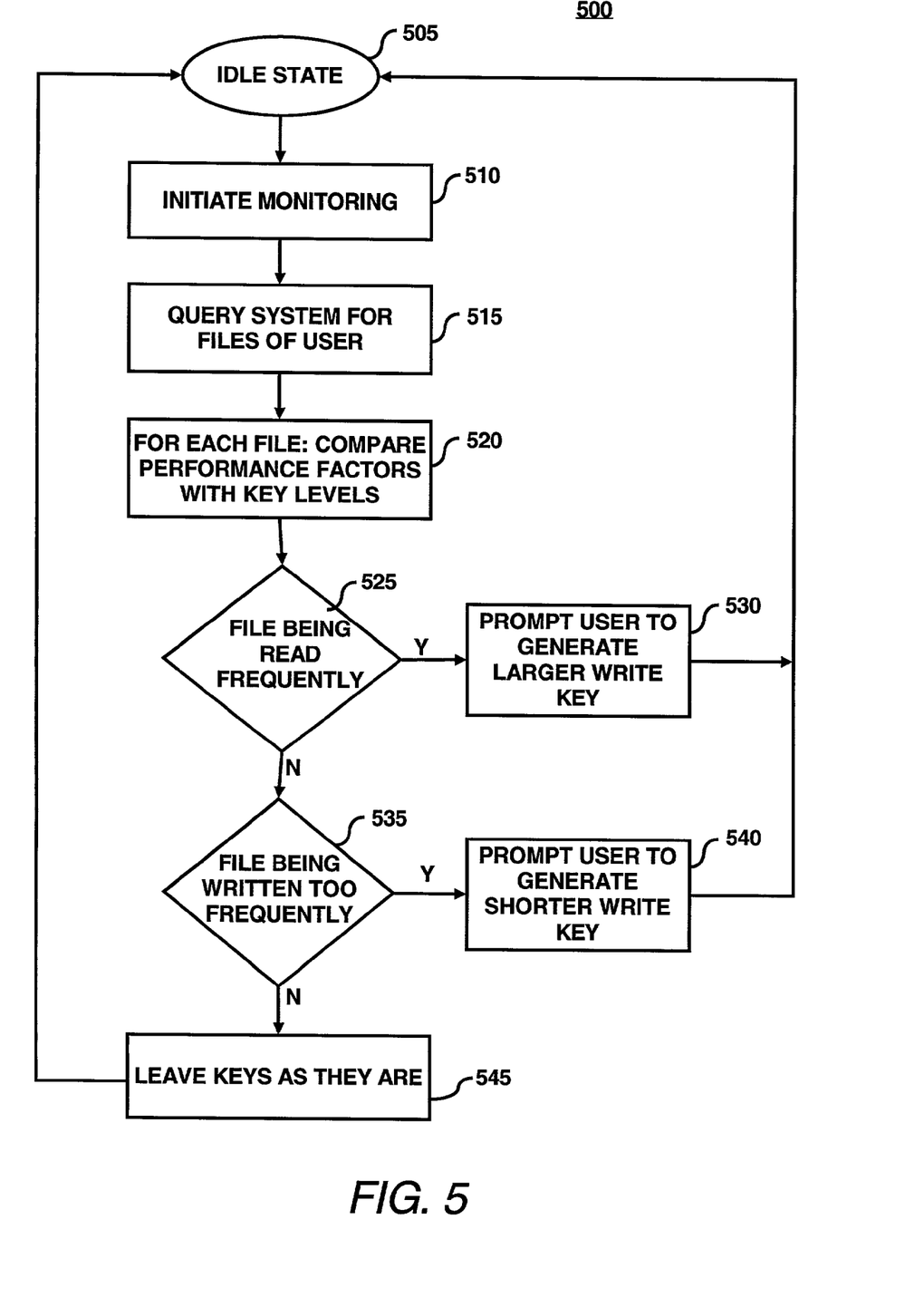
FIG. 5 illustrates a flow diagram for a second operational mode of the key management module shown in FIG. 1 in accordance with an exemplary embodiment of the present invention.

FIG. 5 illustrates a flow diagram for a second operational mode of the key management module shown in FIGS. 1 and 2 in accordance with an exemplary embodiment of the present invention. Although, for illustrative purposes only, FIG. 5 illustrates a flow diagram for a second operational mode with the following steps, it should be readily apparent to those of ordinary skill in the art that FIG. 5 represents a generalized illustration of an embodiment of the key management module 140 and that other steps may be added or existing steps may be removed or modified without departing from the spirit or scope of the present invention.

As shown in FIG. 5, in step 505, the key manager module 210 may be configured to be in an idle state. In step 510, the key manager module 210 may be configured to invoke an optimization function by initiating a review of the performance parameters associated with files stored on the shared file system 130. For example, the second operational mode may be initiated by a 'cron' program or the second operational mode may be implemented as a daemon.

In step 515, the key manager module 210 may notify the monitor module 215 to initiate a query for the performance parameters associated with the files of a user stored on the shared file system 130. In particular, the monitor module 215 may be configured to monitor and compile performance parameters (e.g., read/write frequency) on the files stored on the shared file system 130. The monitor module 215 may be configured to forward the performance parameters to the key manager module 210. Alternatively, the monitor module 215 may be configured to query the shared file system 130 for the performance parameters associated with the user's files and forward the performance parameters to the key manager module 210.

In step 520, for each file, the key manager module 210 may be configured to performance parameters to a table of key length levels, which is stored in the memory module 220. The key length levels table may be configured to provide a listing of sizes of asymmetric key pair, each listing corresponding to a level of a performance parameter (e.g., read/write access frequency). An example of such a table is given by Table II:

TABLE II

| Read/write frequency | Read key length | Write key length |
| --- | --- | --- |
| lowest | 128 bits | 896 bits |
| average | 512 bits | 512 bits |
| highest | 896 bits | 128 bits |

There is a lower limit to the length of each key to ensure proper security, but within this range, any key length may be chosen, as long as the combined length sums to the total desired key length.

In step 525, the key manager module 210 may be configured to determine if the access for the given file has been historically been more read-accesses. If the file has been read-frequently, the key manager module 210 may be configured to prompt the user to generate a larger length write key and thus a shorter length read key, in step 530. The user may then invoke the key generation module 230 to generate the appropriate sized keys for the given file. Subsequently, the key manager module 210 may be configured to return to the idle state of step 505.

Otherwise, in step 535, the key manager module 210 maybe configured to determine if the access for the given file has been historically been more write-accesses. If the file has been write-often frequently, the key manager module 210 may be configured to prompt the user to generate a short length write key and thus a longer length read key, in step 540. The user may then invoke the key generation module 230 to generate the appropriate sized keys for the given file. Subsequently, the key manager module 210 may be configured to return to the idle state of step 505.

Otherwise, in step 545, if the files are not either read-frequently or write-often frequently, the key manager module 210 may be configured not to modify the length of the keys. Subsequently, the key manager module 210 may return to an idle state.

Figure 6:
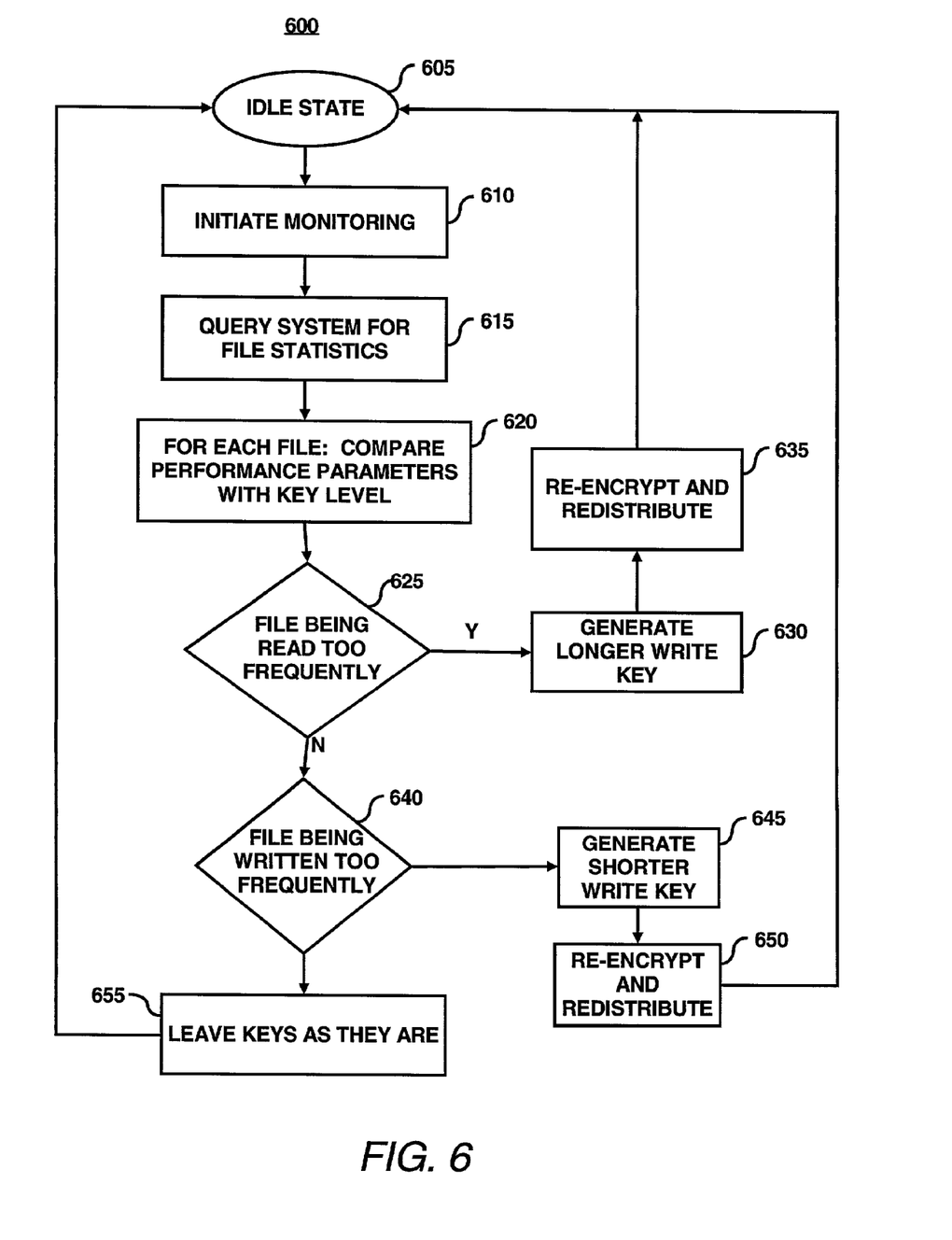
FIG. 6 illustrates a flow diagram for an alternative second operational mode of the key management module shown in FIG. 1 in accordance with an exemplary embodiment of the present invention.

FIG. 6 illustrates a flow diagram for an alternative second operational mode of the key management module shown in FIGS. 1 and 2 in accordance with an exemplary embodiment of the present invention. Although, for illustrative purposes only, FIG. 6 illustrates a flow diagram for an alternative second operational mode with the following steps, it should be readily apparent to those of ordinary skill in the art that FIG. 6 represents a generalized illustration of an embodiment of the key management module 140 and that other steps may be added or existing steps may be removed or modified without departing from the spirit or scope of the present invention.

As shown in FIG. 6, in step 605, the key manager module 210 may be configured to be in an idle state. In step 610, the key manager module 210 may be configured to invoke an optimization function by initiate a review of the performance parameters associated with files stored on the shared file system 130. For example, the alternative second operational mode may be initiated by a 'cron' program or the second operational mode may be implemented as a daemon.

In step 615, the key manager module 210 may notify the monitor module 215 to initiate a query for the performance parameters associated with the files of a user stored on the shared file system 130. In particular, the monitor module 215 may be configured to monitor and compile performance parameters (e.g., read/write frequency) on the files stored on the shared file system 130. The monitor module 215 may be configured to forward the performance parameters to the key manager module 210. Alternatively, the monitor module 215 may be configured to query the shared file system 130 for the performance parameters associated with the user's files and forward the performance parameters to the key manager module 210.

In step 620, for each file, the key manager module 210 may be configured to compare the performance parameters to a table of key length levels, which may be stored in the memory module 220. The key length levels table may be configured to provide a listing of sizes of asymmetric key pair, each listing corresponding to a level of a performance parameter (e.g., read frequency).

In step 625, the key manager module 210 may be configured to determine whether the access for the given file has been historically been more read-accesses. If the file has been read-frequently, the key manager module 210 may be configured to initiate the key generation module 230 to generate a larger length write key and thus a shorter length read key, in step 630. In step 635, the key manager module 210 may be further configured to apply the new asymmetric key pair to the files. The asymmetric key pair is then forwarded to the key distribution center 150 for further processing. Subsequently, the key manager module 210 may be configured to return to the idle state of step 605.

In step 640, the key manager module 210 may be configured to determine whether the access for the given file has been historically been more write accesses. If the file has been write frequently, the key manager module 210 may be configured to initiate the key generation module 230 to generate a shorter length write key and thus a longer length read key, in step 645. In step 650, the key manager module 210 may be further configured to apply the new asymmetric key pair to the files. The asymmetric key pair is then forwarded to the key distribution center 150 for further processing. Subsequently, the key manager module 210 may be configured to return to the idle state of step 605.

Otherwise, in step 655, if the files are not either read frequently or write-often frequently, the key manager module 210 may be configured not to modify the length of the keys. Subsequently, the key manager module 210 may return to the idle state of step 605.

Certain embodiments of the present invention may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method for improving storage system efficiency, comprising:
   comparing a plurality of performance parameters of a file with a respective plurality of predetermined values; and
   modifying a first key of said file in response to one performance parameter of said plurality of performance parameters not matching a respective one predetermined value, wherein said first key is utilized in a security procedure for said file.

2. The method according to claim 1, further comprising:
   utilizing said first key of a larger length than a predetermined key length in said security procedure for said file in response to said one performance parameter exceeding said predetermined value.

3. The method according to claim 1, further comprising:
   utilizing said first key of a larger length than a predetermined key length in said security procedure for said file in response to said one performance parameter falling below said predetermined value.

4. The method according to claim 1 further comprising:
   utilizing said first key of a shorter length than a predetermined key length in said security procedure for said file in response to said one performance parameter falling below said respective predetermined value.

5. The method according to claim 1, further comprising:
   utilizing said first key of a shorter length than a undetermined key length in said security procedure for said file in response to said one performance parameter exceeding said respective predetermined value.

6. The method according to claim 1, further comprising modifying a second key complementary to the first key in response to said modification of said first key, wherein said complementary second key is utilized in said security procedure of said file.

7. The method according to claim 1, wherein said modification of said first key is an increase in a length of said first key.

8. The method according to claim 7, further comprising:
   decreasing a length of a second key by a complementary amount of said increase of said length of said first key.

9. The method according to claim 1, wherein said modification of said first key is a decrease in a length of said first key.

10. The method according to claim 9, further comprising:
    increasing a length of a second key by a complementary amount of said decrease of said length of said first key.

11. A method for improving efficiency in a cryptographic system, comprising:
    comparing a plurality of performance parameters of a file with a respective plurality of predetermined values;
    altering a length of a first key in response to one performance factor of said plurality of performance parameters of said tile not matching a respective one of predetermined value; and
    altering a length of a second key in response to said alteration of said first key, wherein said first key and said second key are utilized in a security procedure for said file.

12. The method according to claim 11, wherein said alteration of said length of first key is an increase in length and said alteration of length of said second key is a decrease in length.

13. The method according to claim 11, wherein said alteration of said length of first key is a decrease in length and said alteration of length of said second key is an increase in length.

14. A method for improving efficiency in a cryptographic system, comprising:
    comparing a plurality of performance parameters of a file with a respective range of plurality of predetermined values;
    altering a length of a first key in response to one performance factor of said plurality of performance parameters of said file falling outside a respective range of one predetermined value; and altering a length of a second key in response to said alteration of said first key, wherein said first key and said second key are utilized in a security procedure for said file.

15. A system for improving storage system efficiency, comprising:
a file system configured to provide access to a plurality of files;
a network monitoring module configured to monitor a plurality of performance factors on said file system; and
a key management module, wherein said key management module is configured to compare said plurality of performance factors with a respective plurality of predetermined values, and is also configured to modify a first key of a file stored on said file system in response to one performance factor of said plurality of performance factors not equaling a respective one predetermined value, wherein said first key is utilized in a security procedure for said file on said file system.

16. The system according to claim 15, wherein said key management node is further configured to re-encrypt said file with said first key of a larger length than a predetermined key length in response to said one performance factor exceeding said respective one predetermined value.

17. The system according to claim 15, wherein said key management node is further configured to re-encrypt said file with said first key of a larger length than a predetermined key length in response to said one performance factor falling below said respective predetermined value.

18. The system according to claim 15, wherein said key management node is further configured to re-encrypt said file with said first key of a smaller length than a predetermined key length in response to said one performance factor exceeding said respective predetermined value.

19. The system according to claim 15, wherein said key management node is further configured to re-encrypt said file with said first key of a smaller length than a predetermined key length in response to said one performance factor falling below said respective predetermined value.

20. The system according to claim 15, wherein said key management node is further configured to modify a second key complementary to the first key in response to said modification of said first key.

21. The system according to claim 15, wherein said modification of said first key is an increase in a length of said first key.

22. The system according to claim 21, wherein key management node is further configured to decrease a length of a second key by an amount of said increase of said first key.

23. The system according to claim 15, wherein said modification of said first key is a decrease in a length of said first key.

24. The system according to claim 23, wherein said key management node is further configured to increase a length of a second key by an amount of said decrease of said first key.

25. The system according to claim 15, further comprising:
a user station; and
a network configured to a communication channel between said file system and said user station, wherein said user station comprises:
at least one processor; and
a memory coupled to said at least one processor, wherein said key management module and network monitoring module reside on said memory and are executed by said at least one processor.

26. A system for improving storage system efficiency, comprising:
a file system configured to provide access to a plurality of files;
a network monitoring module configured to monitor a plurality of performance factors of said plurality of files; and
a key management module, wherein said key management module is configured to complete said plurality of performance factors with a respective plurality of predetermined values, is also configured to alter a length of a first key in response to said one performance factor of said plurality of performance factors not matching a respective one predetermined value, and is further configured to alter a length of a second key in response to said alteration of said first key, wherein said first key end said second key are utilized in a security procedure for said file stored on said file system.

27. The method according to claim 26, wherein said alteration of said length of first key is an increase in length and said alteration of length of said second key is a decrease in length.

28. The method according to claim 26, wherein said alteration of said length of first key is a decrease in length and said alteration of length of said second key is an increase in length.

29. A system for improving storage system efficiency, comprising:
a file system configured to provide access to a plurality of files;
a network monitoring module configured to monitor a plurality of performance factors of said plurality of files; and
a key management module wherein said key management module is configured to compare said plurality of performance factors with a respective range of plurality of predetermined values, is also configured to alter a length of a first key in response to said one performance factor of said plurality of performance factors falling outside a respective range of one predetermined value, and is further configured to alter a length of a second key in response to said alteration of said first key, wherein said first key and said second key are utilized in a security procedure for said file stored on said file system.

* * * * *

UNITED STATES PATENT AND TRADEMARK OFFICE
CERTIFICATE OF CORRECTION

PATENT NO. : 7,003,116 B2  Page 1 of 1
APPLICATION NO. : 09/984936
DATED : February 21, 2006
INVENTOR(S) : Erik Riedel et al.

It is certified that error appears in the above-identified patent and that said Letters Patent is hereby corrected as shown below:

In column 12, line 13, in Claim 4, after "claim 1" insert -- , --.

In column 12, lines 19-20, in Claim 5, delete "undetermined" and insert -- predetermined --, therefor.

In column 12, line 23, in Claim 6, delete "comprising" and insert -- comprising: --, therefor.

In column 12, line 47, in Claim 11, delete "tile" and insert -- file --, therefor.

In column 14, line 20, in Claim 26, delete "complete" and insert -- compare --, therefor.

In column 14, line 28, in Claim 26, delete "end" and insert -- and --, therefor.

In column 14, line 46, in Claim 29, after "module" insert -- , --.

Signed and Sealed this

Second Day of June, 2009

JOHN DOLL
*Acting Director of the United States Patent and Trademark Office*